(12) United States Patent
Devkar et al.

(10) Patent No.: US 10,701,164 B2
(45) Date of Patent: Jun. 30, 2020

(54) ENGAGED MICRO-INTERACTIONS ON DIGITAL DEVICES

(71) Applicant: Tata Consultancy Services Limited, Mumbai (IN)

(72) Inventors: Sujit Devkar, Thane (IN); Pankaj Doke, Thane (IN); Sylvan Lobo, Thane (IN)

(73) Assignee: Tata Consultancy Services Limited, Mumbai (IN)

(*) Notice: Subject to any disclaimer, the term of this patent is extended or adjusted under 35 U.S.C. 154(b) by 197 days.

(21) Appl. No.: 15/473,378

(22) Filed: Mar. 29, 2017

(65) Prior Publication Data
US 2017/0366628 A1 Dec. 21, 2017

(30) Foreign Application Priority Data
Jun. 17, 2016 (IN) .............................. 201621020816

(51) Int. Cl.
*H04L 29/08* (2006.01)
*G06F 16/9535* (2019.01)
*G06F 16/2457* (2019.01)
*G06F 11/34* (2006.01)
*G06F 16/95* (2019.01)
*H04L 12/58* (2006.01)

(52) U.S. Cl.
CPC .......... *H04L 67/22* (2013.01); *G06F 11/3438* (2013.01); *G06F 16/24578* (2019.01); *G06F 16/95* (2019.01); *G06F 16/9535* (2019.01); *H04L 51/10* (2013.01); *H04L 51/32* (2013.01); *H04L 67/306* (2013.01)

(58) Field of Classification Search
CPC ......... H04L 67/22; H04L 51/10; H04L 51/32; H04L 67/306; G06F 11/3438; G06F 17/3053; G06F 17/30861; G06F 17/30867
See application file for complete search history.

(56) References Cited

U.S. PATENT DOCUMENTS

| 5,996,022 | A | * | 11/1999 | Krueger | G06F 8/65 709/247 |
| 6,892,354 | B1 |  | 5/2005 | Servan-Schreiber et al. | |
| 8,060,407 | B1 | * | 11/2011 | Delker | G06Q 30/00 705/14.68 |

(Continued)

*Primary Examiner* — Dhairy A Patel
*Assistant Examiner* — Sujana Khakural
(74) *Attorney, Agent, or Firm* — Finnegan, Henderson, Farabow, Garrett & Dunner LLP

(57) ABSTRACT

A technique for engaged micro-interactions on digital devices is disclosed. In an embodiment, activities performed on a digital device are monitored. Further, at least one user accessing the digital device and friends associated with the user are determined based on the activities. Furthermore, a profile for the user and friends is created. Moreover, time spent and required to perform an action on content are determined based on the profile. In addition, a list of desires associated with the user and/or friends is determined based upon the activities and/or time spent and required to perform the action on the content. Also, the list of desires are ranked based on the activities to be performed by the user and friends. The user and/or friends are then engaged by providing a micro-interaction on the digital device based on the ranking of the list of desires and a time required to download online content.

12 Claims, 3 Drawing Sheets

(56) References Cited

U.S. PATENT DOCUMENTS

| | | |
|---|---|---|
| 8,886,637 B2 | 11/2014 | Bennett |
| 10,127,564 B2* | 11/2018 | Heath ................... G06Q 30/02 |
| 2001/0056370 A1* | 12/2001 | Tafla ................... G06F 3/0481 |
| | | 705/14.69 |
| 2007/0184820 A1* | 8/2007 | Marshall ............... G06Q 30/02 |
| | | 455/414.3 |
| 2009/0006213 A1 | 1/2009 | Lerman et al. |
| 2009/0077568 A1* | 3/2009 | Chiu ..................... G06F 9/451 |
| | | 719/314 |
| 2011/0154213 A1* | 6/2011 | Wheatley ............. G06F 3/0481 |
| | | 715/738 |
| 2011/0173198 A1* | 7/2011 | Malleshaiah ........ G06F 16/337 |
| | | 707/737 |
| 2013/0110864 A1 | 5/2013 | Ketcham et al. |
| 2014/0019453 A1* | 1/2014 | Mohan ................ G06F 16/9535 |
| | | 707/738 |
| 2014/0143803 A1* | 5/2014 | Narsimhan ........ H04N 5/44591 |
| | | 725/34 |
| 2014/0171039 A1* | 6/2014 | Bjontegard ........... H04W 4/029 |
| | | 455/414.1 |
| 2015/0058423 A1* | 2/2015 | Chen ..................... G06Q 50/01 |
| | | 709/204 |
| 2015/0066959 A1 | 3/2015 | Yi et al. |
| 2016/0267520 A1* | 9/2016 | Kalish ................ G06Q 30/0242 |
| 2017/0201524 A1* | 7/2017 | Dureau ................ H04L 63/101 |

\* cited by examiner

ENGAGED MICRO-INTERACTIONS ON DIGITAL DEVICES

PRIORITY CLAIM

This U.S. patent application claims priority under 35 U.S.C. § 119 to: India Application No. 201621020816, filed on Jun. 17, 2016. The entire contents of the aforementioned application are incorporated herein by reference.

TECHNICAL FIELD

The embodiments herein generally relate to micro-interactions and, more particularly, to engaged micro-interactions on digital devices.

BACKGROUND

Generally, service providers on Internet give different services to their users. Every service provider wants users to stay on the site as long as possible and use their services. One of the factors which is responsible for bad user experience and user engagement is Internet on which the service provider doesn't have control. The request to response time can vary based upon network latency, server capacity, device capacity, etc. In such cases, the user may shift to other service providers to use their services.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides a technique for engaged micro-interactions on digital devices is disclosed.

In one aspect, a method for engaged micro-interactions on digital devices is disclosed. In this aspect, activities performed on a digital device are monitored, the activities comprise collocated or non-collocated reading, browsing, playing game and chatting and a collaborative session. Further, at least one user accessing the digital device and friends associated with the at least one user are determined based on the activities performed on the digital device. Furthermore, a profile for the at least one user and friends associated with the at least one user is determined, the profile comprises a voice profile, a behavior profile, a gesture profile and an activity profile. In addition, time spent on content presented on the digital device and time required to perform an action on the content by the at least one user and/or the friends associated with the at least one user are determined based on the profile of the at least one user and/or the friends associated with the at least one user, the action comprises at least one of reading, viewing and making a decision.

Moreover, a list of desires associated with the at least one of the user and/or the friends associated with the at least one user is determined based upon at least one of the time spent on the content, time required to perform the action on the content and the activities. Further, the list of desires are ranked based on the activities to be performed by the at least one user and the friends associated with the at least one user. Further, a download time of online content is computed when the at least one user and/or the friends associated with the at least one user request for the online content on the digital device. Furthermore, the at least one user and/or the friends associated with the at least one user are engaged by providing a micro-interaction on the digital device based on the ranking of the list of desires and the computed download time.

In another aspect, a digital device for engaged micro-interactions is disclosed. In an example, the digital device includes one or more processors and a memory communicatively coupled to the processors. Further, the memory includes an engagement unit. In an example implementation, the engagement unit monitors activities performed on the digital device, the activities include collocated or non-collocated reading, browsing, playing game and chatting and a collaborative session. Further, the engagement unit determines at least one user accessing the digital device and friends associated with the at least one user based on the activities performed on the digital device. Furthermore, the engagement unit creates a profile for the at least one user and friends associated with the at least one user, the profile includes a voice profile, a behavior profile, a gesture profile and an activity profile.

In addition, the engagement unit determines time spent on content presented on the digital device and time required to perform an action on the content by the at least one user and/or the friends associated with the at least one user based on the profile of the at least one user and/or the friends associated with the at least one user, the action includes at least one of reading, viewing and making a decision. Moreover, the engagement unit determines a list of desires associated with the at least one of the user and/or the friends associated with the at least one user based upon at least one of the time spent on the content, time required to perform the action on the content and the activities. Also, the engagement unit ranks the list of desires based on the activities to be performed by the at least one user and the friends associated with the at least one user. Further, the engagement unit computes a download time of online content when the at least one user and/or the friends associated with the at least one user request for the online content on the digital device. Furthermore, the engagement unit engages the at least one user and/or the friends associated with the at least one user by providing a micro-interaction on the digital device based on the ranking of the list of desires and the computed download time.

It should be appreciated by those skilled in the art that any block diagram herein represent conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein are better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The term "people" is used to refer "users and/or friends" throughout the document.

In an example embodiment, the present technique provides micro-interactions for user engagement with digital devices in computer supported collaborative work (CSCW) settings. In other words, the present technique engages a user or user group (user and associated friends) with the digital devices using micro-interactions. For example, engagement means when the user is performing an activity, resources are provided to the group of users to interact with each other that makes the user use the digital device without any disconnect between user and the digital device. The present technique also qualifies activities for micro-interactions that involve triggers and feedbacks. The activities include, but not limited to, when the user or group is idle, the user or group wants to interact, play, chat, draw, and work and so on. The present technique determines user or user group desires and optimizes resources (e.g. text, voice, video, image, interactions and so on) for micro-interaction based user engagement. Thus, optimizing the time for which the user or user group be engaged with the digital device and the resources for better engagement.

In an example implementation, the present technique performs the user or user group engagement by determining the user or user group desires, computing time for consumption for each user, determining appropriate resources for the user or user group and determining appropriate micro-interaction for the user or user group.

Figure 1:
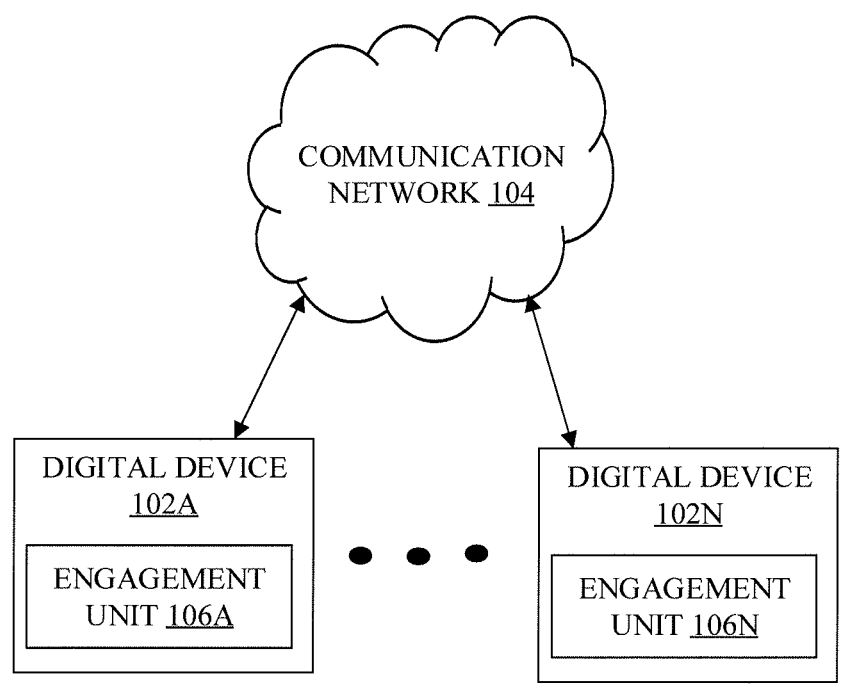
FIG. 1 illustrates a block diagram of a system for engaged micro-interactions on digital devices, according to an embodiment of the present disclosure.

FIG. 1 illustrates a block diagram of a system 100 for engaged micro-interactions on digital devices, according to an embodiment of the present disclosure. As shown in FIG. 1, the system 100 includes multiple digital devices 102A-N communicatively coupled to each other via a communication network 104. Example digital devices 102A-N include mobile phones, computing devices and so on. Further as shown in FIG. 1, each of the digital devices 102A-N includes an engagement unit 106A-N, respectively.

In an example embodiment, an engagement unit (e.g., the engagement unit 106A) monitors activities performed on the digital device 102A. The activities may include collocated or non-collocated reading, browsing, playing game and chatting and a collaborative session. In an example, the activities performed on the digital device 102A are monitored using multiple sensors in the digital device 102A. For example, the multiple sensors include a proximity sensor, a gyroscope, an accelerometer, an orientation sensor and the like. Further, the engagement unit 102A determines at least one user accessing the digital device 102A and friends associated with the at least one user based on the activities performed on the digital device 102A. For example, the friends associated with the user include one or more users accessing the digital devices 102B-N or friends sitting around the user accessing the digital device 102A. Furthermore, the engagement unit 106A determines a profile for the at least one user and friends associated with the at least one user. The profile may include a voice profile, a behavior profile, a gesture profile, an activity profile and the like.

In addition, the engagement unit 106A determines time spent on content presented on the digital device and time required to perform an action on the content by the at least one user and/or the friends associated with the at least one user based on the profile of the at least one user and/or the friends associated with the at least one user. The action may include reading, viewing, making a decision and the like. In an example implementation, the engagement unit 106A divides the content presented on the digital device into multiple pages, each of the multiple pages is a unit of content visible to the at least one user and/or the friends associated with the at least one user. Further, the engagement unit 106A computes a number of words and images in each of the multiple pages. Furthermore, the engagement unit 106A determines the time spent on the content and the time required to perform the action on the content based on the profile of the at least one user and/or the friends associated with the at least one user when one of the multiple pages appears on the digital device. In some embodiments, the engagement unit 106A determines at least one of a tag or a comment in the one of the multiple pages. The engagement unit 106A determines the time spent on the one of the multiple pages and the time required to perform the action on the one of the multiple pages along with the determined at least one of the tag or comment on the digital device based on the profile of the at least one user and/or the friends associated with the at least one user. In another example implementation, the engagement unit 106A records triggers in the activities. The triggers may include the content that requires user's input. Further, the engagement unit 106A determines the time spent on the content and time required for making the decision on the content.

Also, the engagement unit 106A determines a list of desires associated with the at least one of the user and/or the friends associated with the at least one user based upon at least one of the time spent on the content, time required to perform the action on the content and the activities. In an example, the list of desires include at least one of reading jokes and viewing images of a person or place, content which is required to read or view based on an activity being performed, any useful content or micro-interaction.

Moreover, the engagement unit 106A ranks the list of desires based on the activities to be performed by the at least one user and the friends associated with the at least one user. Further, the engagement unit 106A computes a download time of online content when the at least one user and/or the friends associated with the at least one user request for the online content on the digital device. In an example implementation, the engagement unit 106A obtains network latency information, a number of concurrent requests, network utilization information and response time information from a service provider used in the digital device 102A when the at least one user and/or the friends associated with the at least one user request for the online content. The engagement unit 106A then computes the download time of the online content based on the obtained network latency information, number of concurrent requests, network utilization information and response time information.

Further, the engagement unit 106A engages the at least one user and/or the friends associated with the at least one user by providing a micro-interaction on the digital device 102A based on the ranking of the list of desires and the computed download time. In an example, the micro-interaction includes phone vibrations, a change of screen brightness or colors and/or displaying text or image snippets to the at least one user and the friends associated with the at least one user. In an example implementation, the engagement unit 106A engages the at least one user and/or the friends associated with the at least one user by providing the micro-interaction on the digital device 102A based on the ranking of the list of desires and the download time when the download time is greater than a predetermined threshold time. In another example implementation, the engagement unit 106A engages the at least one user and/or the friends associated with the at least one user by providing the micro-interaction on the digital device 102A such that a difference between the download time and a time required to perform an action on the micro-interaction by the at least one user and/or the friends associated with the at least one user is zero. This is explained in more detail with reference to FIG. 2.

Figure 2:
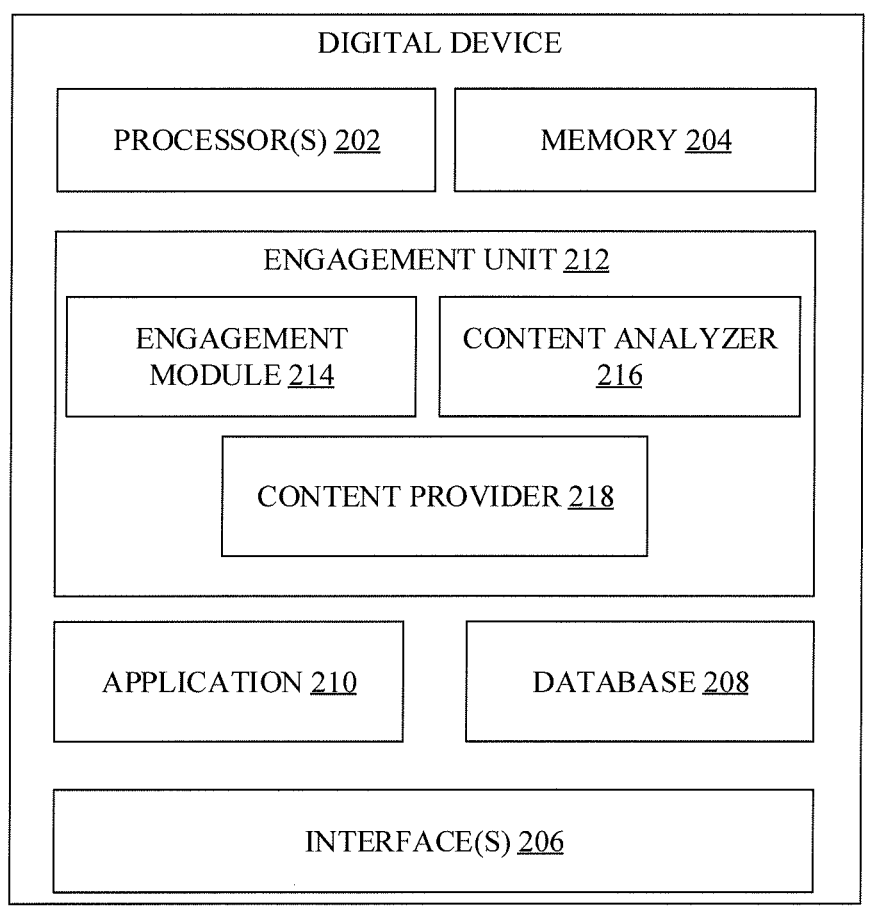
FIG. 2 illustrates a digital device shown in FIG. 1, according to an embodiment of the present disclosure.

FIG. 2 illustrates a block diagram of a digital device 200 (one of the digital devices 102A-N), according to an embodiment of the present disclosure. As shown in FIG. 2, the digital device 200 includes one or more processor(s) 202 and a memory 204 communicatively coupled to each other. The digital device 200 also includes interface(s) 206. Further, the memory 204 includes a database 208, an application 210 and modules, such as an engagement unit 212 (one of the engagement units 106A-N) and other modules. Furthermore, the engagement unit 212 includes an engagement module 214, a content analyzer 216 and a content provider 218. In an example, the engagement module 214 is a main operating unit that co-ordinates with the application 210 and other modules 216 and 218. The application 210 (e.g., a mobile browser and so on) runs in the environment of the digital device 200. The content provider 218 may store data downloaded or data present in the digital device 200 indexed for easier search. The data is saved in the database 208 under read content and unread content. The content provider 218 has access to Internet. The database 208 also stores the logs of the user, user read and unread content along with tags to categorize the content. Although FIG. 2 shows example components of the digital device 200, in other implementations, the digital device 200 may contain fewer components, additional components, different components, or differently arranged components than depicted in FIG. 2.

The processor(s) 202 and the memory 204 may be communicatively coupled by a system bus. The processor(s) 202 may include circuitry implementing, among others, audio and logic functions associated with the communication. The processor(s) 202 may include, among other things, a clock, an arithmetic logic unit (ALU) and logic gates configured to support operation of the processor(s) 202. The processor(s) 202 can be a single processing unit or a number of units, all of which include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 204.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting the digital device 200 to other devices as shown in FIG. 1.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204, may store any number of pieces of information, and data, used by the digital device 200 to implement the functions of the digital device 200. The memory 204 may be configured to store information, data, applications, instructions or the like for enabling the digital device 200 to carry out various functions in accordance with various example embodiments. Additionally or alternatively, the memory 204 may be configured to store instructions which when executed by the processor(s) 202 causes the digital device 200 to behave in a manner as described in various embodiments. The memory 204 includes the engagement unit 208 and other modules. The unit 212 and other modules include routines, programs, objects, components, data structures, etc., which perform particular tasks or implement particular abstract data types. The other modules may include programs or coded instructions that supplement applications and functions of the digital device 200

In operation, the engagement module 214 determines a user or user group's (i.e., user and friends associated with the user) context, users in a group, group activities and desires/needs/intents. For example, the activities include collocated or non-collocated, synchronous or asynchronous activities. In this example, the activities include offline and online activities such as, but not limited to meetings, discussion, presentation, play game, constructing a model, watching a movie, reviewing a document, deciding on a pizza or movie or tourism, taking a selfie, calling, using Facebook Messenger, Google Docs, reading literature, video or audio or text calls or chats (group conversations), eating at a place together or watching YouTube videos or TV series or movies together or playing Teen Patti online, etc.

Further, the engagement module 214 captures user emotions, hand gestures, user behavior, eye gaze and so on. Furthermore, the engagement module 214 records the user's voice and other user's voices (e.g., friends or other users). The engagement module 214 then match the voices and recognize people. Then, the engagement module 214 use voice recognition to determine speech and keyword spotting from multiple users to support the engagement in terms of new content or micro-interactions. For example, keyword spotting is distributed across people and the keywords are different for different people (e.g., there are profiles as U1, U2, U3, and so on). These user personalities have weightage and a user is given different suggestions for users U2, U3 and so on.

In an example, the engagement module 214 captures voice samples from incoming calls to the user and creates a voice profile for each of callers and associate a label with the voice profile. When the engagement module 214 want to know who the users are in vicinity, the engagement module 214 captures the voice samples of the people in surrounding. The engagement module 214 matches with the earlier created voice profiles. If they don't match, then the engagement module 214 requests the devices in vicinity to share voice profiles of the respective users. In an embodiment, the digital device 200 senses presence of other digital devices in the current settings using Wi-Fi or Bluetooth or global positioning system (GPS). Hence, the engagement module 214 determines if the users and/or friends are collocated or are at remote locations.

In an example implementation, the engagement module 214 creates a profile of the user as a voice profile, a behavior profile, an activity profile and so on. Such profiles resides on users' digital devices. In an embodiment, the engagement module 214 creates profiles for other people (e.g., friends) who are in a group. Thus, the digital device 200 have owner's profiles and other friend's profiles. In an example embodiment, when two people are doing an activity together and separately, there are three clusters (distinct profiles of person A and B, and overlap). Based on cluster mapping (time series cluster analysis is performed) with individual and in the group, desires are determined. In this embodiment, the profiles of the users are clusters of desires.

In an example, the engagement module 214 captures voice samples from incoming calls to the user and creates a voice profile for each of callers and associate a label with the voice profile. When the engagement module 214 want to know who the users are in vicinity, the engagement module 214 captures the voice samples of the people in surrounding. The engagement module 214 matches with the earlier created voice profiles. If they don't match, then the engagement module 214 requests the devices in vicinity to share voice profiles of the respective users. In an embodiment, the digital device 200 senses presence of other digital devices in the current settings using Wi-Fi or Bluetooth or global positioning system (GPS). Hence, the engagement module 214 determines if the users and/or friends are collocated or are at remote locations.

In addition, the engagement module 214 records engagement level or activities (via sensors, gyroscope, accelerometer, orientation sensors, etc.) with the digital device 200 and with other users in the group. Rules give the user idea, nudge, give interesting tidbits, clues (micro-interaction) what the user can contribute, etc. For example, the activities can be determined from the photography, music or common tourist spots as inferred from latitude longitude of photos present in the digital device 200.

Also, the content analyzer 216 has access to the application 210 installed on the device 200. The content analyzer 216 records users and/or friends' preferences for different categories of contents based upon the time spent by the users and/or friends on the content categories. Based upon the interactions or activities with the device 200, the content analyzer 216 determines a consumption rate for different types of contents. In an embodiment, the content analyzer 216 monitors the activities (i.e., engagement or interaction) with the device 200 and the application 210 (when the users and/or friends are idle/not engaged). Further, the content analyzer 216 determines types of triggers the users and/or friends requires to perform an interaction with the digital device 200. Furthermore, the content analyzer 216 then motivates the users and/or friends to do something.

In some embodiments, the content analyzer 216 records user cues. The cues can act as a micro-interaction and can be shown to other users who is not collocated to show engagement of other users with the digital device 200. The content analyzer 216 understands body language/verbal/nonverbal cues, gestures of the other users who are bored, not understanding, monopolizing the digital device 200.

Further, the content analyzer 216 analyzes the content (text, image, etc.) and builds a statistical model for user engagement. In the digital device 200, the users and/or friends have many applications (e.g., the application 210) which belong to different categories e.g. news, entertainment, education, games, etc. The users and/or friends have preferences over content and the users and/or friends have different levels of interest in different categories e.g. a user may like to read political news than educational content and some other user may like education content over news and so on. Thus, time to read for a person changes based upon his abilities and interests. The content analyzer 216 computes user reading preferences based upon the time spent on reading the preferred content and time required to read the content. The time to read some content can be captured by a) presenting some content and computing the time or b) monitoring user activities on the applications for computing the time. In a) the content analyzer 216 presents the content to the users and/or friends from a category X, and computes time till the users and/or friends press a button done (or next, et cetera). The users and/or friends are presented a sequence of images and time for which the image is visible to the users and/or friends is computed. In b) the content analyzer 216 divides the content presented as a response to a request in pages. The page may be a unit of content visible to the user. The content analyzer 216 computes the number of words, images in each page. Whenever a page appears on the screen, the content analyzer 216 starts computing the time and as the user scrolls through the pages. In some embodiments, if the content is associated with tags or comments, then the time for that content along with tag is saved in the database. A user may be going through of skimming through the text at rapid pace, this may be ignored by the content analyzer 216. For example, a user U has average reading speed of 50 words per minute with standard deviation of 10 words for Bollywood news. Now, while the content analyzer 216 computing the reading speed, it records more than 100 words per minute speed. At such point, the content analyzer 216 may ignore it. In these embodiments, a proximity sensor present with the device 200 may compute a distance of the user from the screen. Thus, finding out if the user is reading the content carefully or skimming through the content.

Consider Td is the time to download some content over network, Tr is the time user takes to read some content. The content analyzer 216 computes the time to download for each request and the time to read with the help of the statistical model which is built. Initially, the content analyzer 216 captures the time required for a set of users who have the application installed on their device 200. Thus, the time required for a user to consume given content of a given category by population is computed using a below example equation:

$$Tr = \text{Mean} + SD, \text{ where } SD \text{ is a standard deviation and } Tr \text{ is the rate of content consumption.}$$

The time is different for different categories of content, for example, reading everyday news not take much time as compared to reading Dan Brown's mystery book. This time is set for each user of the digital device 200. The time to read may modify based upon user interaction with the digital device 200 and the content analyzer 216 computes reading time for the content.

$$tr(i) = \text{Mean} + SD, \text{ where } SD \text{ is standard deviation and } tr(i) \text{ is content consumption rate for content type } "i".$$

Assume that for 50 words it takes 2 minutes and downloading time is 3 minutes. Then, tr (i)=f (content) (i)=content/time=content consumption rate+$\Delta$t. Over a period of time, the digital device 200 have content consumption rate for different categories and $\Delta$t is standard deviation. While displaying content to the user, the digital device 200 optimizes Tr−Td=$\Delta$t, where $\Delta$t is a time difference between time to consume content and time to download some other content. Time to download some content and time to read some other content cannot be exactly same and there will be a delta time difference. The Td is known based upon computed network latency received from the engagement module 214. The content analyzer 216 needs to find Tr for which the user is interested to consume the content and the time difference between reading content and download some other content ($\Delta$t) tends to zero. Now, content to show is found out as follows:

$$\text{ContentToShow}(t) = f(Tr)(i) = Td*f(\text{content}) + \Delta,$$

where f (Tr)=time required to require to consume given content and $\Delta$=error.

Now, the content is given ranks based upon the user interests. Thus, the user is shown the text which is interested to the user and the time difference between Tr and Td tends to zero. In some embodiments, there is a transformation function that transforms signals into appropriate micro-interactions form. For example, Haptic/vibrations of the digital device 200 for feedback, showing colors if playing games online or visual, haptic cues while they are remote (use of sensors, or vibrations of devices could communicate), emotions of users presented by colors.

The content provider 218 implements a statistical model for displaying the users and/or friends with interesting and appropriate content. Whenever a user requests for content, some other content gets downloaded along with it. For example, when one opens twitter app, many tweets gets downloaded and one may not get time to read all the tweets, even though the tweets are interesting. Same is with Facebook posts or website with a list of jokes. User may close the app even before the content appears on the mobile handset screen. Such content can be called as unread content and the other as read content i.e. displayed on the screen, is read data. Both type of content is kept in the database 208. The engagement module 214 computes the time to download the requested content and sends it to the content provider 216. Now, the content provider 218 uses the computed time Td to find out content which satisfies Tr−Td=$\Delta$t. Further, the content provider 218 uses below equation to find out content for presenting it to the user.

$$\text{ContentToShow}(t) = f(t)(i) = Td*f(\text{content}) + \Delta$$

Consider, suggestion to show 4 photographs from "Katrina" category which the user likes or 300 words from "Bollywood News" category. Now the content provider 218 searches the database 208 for the content which satisfies the criteria for the user. Now, the user may get top three results for the user as a. 2 tweets b. 3 jokes to display c. 5 Rajanikanth Photos. Now, the database 208 has user interests according to rank. The rank is computed based upon time spent by the user and some other system defined criteria. E.g. the content provider 218 ranks Jokes as 1st category, then it will display the three jokes from that category to the user while some content is being downloaded over Internet.

Further in operation, the engagement module 214 has access to demographic information of the user. The demographic information of the user is kept in the database 208. While using the digital device 200, when the application 210 sends requests for content, some packets as a request to the server, the service provider sends network latency information, number of concurrent requests, network utilization and response time, etc. Thus, the engagement module 214 computes a response time for a total packets of data transfer. If the download time is perceivably (by user) small (let's say 1 second), then the module 214 allows the application 210 to download the content without showing any information. If the total response time is not negligible, then the module 214 invokes the content provider 218 to show offline content to the user. The content provider 218 finds out the appropriate and interesting content for the user. The engagement module 214 displays the information to the user and invokes the content analyzer 216 to compute time to consume the content.

Figure 3:
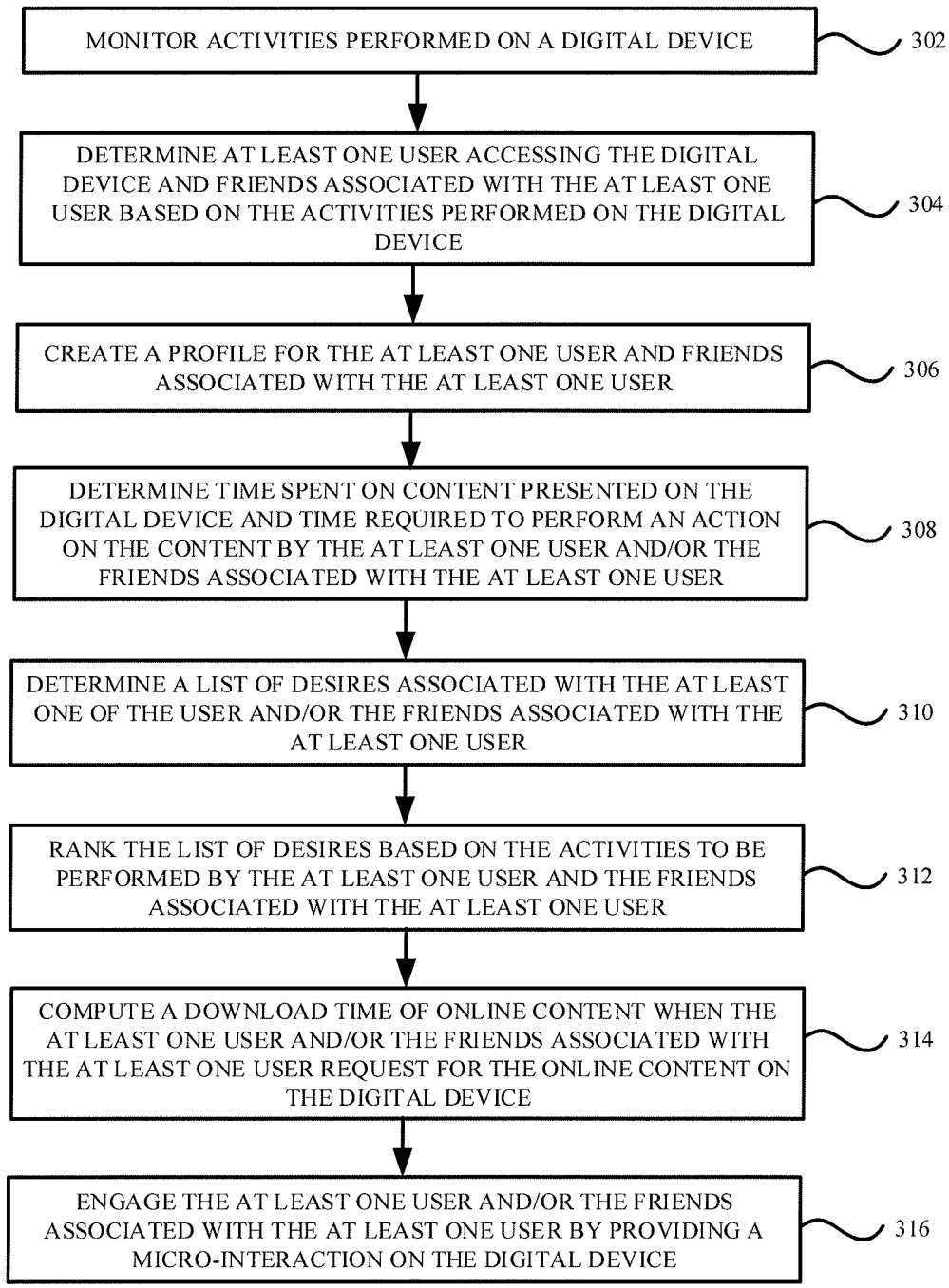
FIG. 3 is a flow chart illustrating a method for engaged micro-interactions on digital devices, according to an embodiment of the present disclosure.

FIG. 3 is a flow chart illustrating a method 300 for engaged micro-interactions on digital devices, according to an embodiment of the present disclosure. At block 302, activities performed on a digital device are monitored. The activities may include collocated or non-collocated reading, browsing, playing game and chatting, a collaborative session and the like. In an example, the activities performed on the digital device are monitored using multiple sensors in the digital device. The multiple sensors may include a proximity sensor, a gyroscope, an accelerometer, an orientation sensor and the like. At block 304, at least one user accessing the digital device and friends associated with the at least one user are determined based on the activities performed on the digital device. At block 306, a profile for the at least one user and friends associated with the at least one user is determined. The profile includes a voice profile, a behavior profile, a gesture profile and an activity profile.

At block 308, time spent on content presented on the digital device and time required to perform an action on the content by the at least one user and/or the friends associated with the at least one user are determined based on the profile of the at least one user and/or the friends associated with the at least one user. The action may include at least one of reading, viewing and making a decision. In an example implementation, the content presented on the digital device is divided into multiple pages, each of the multiple pages is a unit of content visible to the at least one user and/or the friends associated with the at least one user. Further, a number of words and images in each of the multiple pages is computed. Furthermore, the time spent on the content and the time required to perform the action on the content are determined based on the profile of the at least one user and/or the friends associated with the at least one user when one of the multiple pages appears on the digital device. In some embodiments, at least one of a tag or a comment in the one of the multiple pages is determined. The time spent on the one of the multiple pages and the time required to perform the action on the one of the multiple pages along with the determined at least one of the tag or comment on the digital device are determined based on the profile of the at least one user and/or the friends associated with the at least one user. In another example implementation, triggers in the activities are recorded, the triggers include the content that requires user's input. Further, the time spent on the content and time required for making the decision on the content are determined.

At block 310, a list of desires associated with the at least one of the user and/or the friends associated with the at least one user is determined based upon at least one of the time spent on the content, time required to perform the action on the content and the activities. In an example, the list of desires include at least one of reading jokes and viewing images of a person or place, content which is required to read or view based on an activity being performed, any useful content or micro-interaction.

At block 312, the list of desires are ranked based on the activities to be performed by the at least one user and the friends associated with the at least one user. At block 314, a download time of online content is computed when the at least one user and/or the friends associated with the at least one user request for the online content on the digital device. In an example implementation, network latency information, a number of concurrent requests, network utilization information and response time information are obtained from a service provider used in the digital device when the at least one user and/or the friends associated with the at least one user request for the online content. The download time of the online content is then computed based on the obtained network latency information, number of concurrent requests, network utilization information and response time information.

At block 316, the at least one user and/or the friends associated with the at least one user are engaged by providing a micro-interaction on the digital device based on the ranking of the list of desires and the computed download time. In an example, the micro-interaction includes phone vibrations, a change of screen brightness or colors and/or displaying text or image snippets to the at least one user and the friends associated with the at least one user. In an example implementation, the at least one user and/or the friends associated with the at least one user are engaged by providing the micro-interaction on the digital device based on the ranking of the list of desires and the download time when the download time is greater than a predetermined threshold time. In another example implementation, the at least one user and/or the friends associated with the at least one user are engaged by providing the micro-interaction on the digital device such that a difference between the download time and a time required to perform an action on the micro-interaction by the at least one user and/or the friends associated with the at least one user is zero.

The order in which the method(s) are described is not intended to be construed as a limitation, and any number of the described method blocks can be combined in any order to implement the above method, or an alternative method. Additionally, individual blocks may be deleted from the methods without departing from the spirit and scope of the subject matter described herein. Furthermore, the above method can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A method, performed by an engagement unit on a digital device, comprising:
    monitoring, using multiple sensors in the digital device, activities performed by at least one user and friends associated with at least one user on a digital device, wherein the activities comprise collocated or non-collocated reading, browsing, playing game, chatting and a collaborative session;
    determining the at least one user accessing the digital device and the friends associated with the at least one user based on the activities performed on the digital device;
    creating a profile for the at least one user and friends associated with the at least one user, wherein the profile comprises a voice profile, a behavior profile, a gesture profile and an activity profile; wherein the profile is created by capturing and analyzing a voice, emotions, hand gestures, behavior, eye gaze and activities monitored for the at least one user and friends associated with the at least one user;
    determining time spent on content presented via a mobile application on the digital device and time required to perform an action on the content by the at least one of the user and the friends associated with the at least one user based on the profile of the at least one of the user and the friends associated with the at least one user, wherein the action comprises at least one of reading, viewing and making a decision; wherein determining at least one of the time spent on the content and time required for performing the action on the content by the at least one of the user and the friends associated with the at least one user, comprises:
        dividing the content presented on the digital device into multiple pages, wherein each of the multiple pages is a unit of content visible to the at least one of the user and the friends associated with the at least one user;
        computing a number of words and images in each of the multiple pages; and
        determining the time spent on the content and the time required to perform the action on the content based on the profile of the at least one of the user and the friends associated with the at least one user when one of the multiple pages appears on the digital device;

determining a list of desires associated with the at least one of the user and the friends associated with the at least one user based upon at least one of the time spent on the content, time required to perform the action on the content and the activities;

ranking the list of desires based on the activities to be performed by the at least one of the user and the friends associated with the at least one user;

computing a download time of online content when the at least one of user and the friends associated with the at least one user request the online content by using the mobile application on the digital device, wherein said computing download time is based on obtained network latency information, number of concurrent requests, network utilization information and response time information form a remote service provider; and engaging the at least one of user and the friends associated with the at least one user by providing a micro-interaction on the digital device, while the online content is downloading over the Internet as requested by the at least one of user and the friends associated with the at least one user using the mobile application, wherein the micro-interactions are displayed via the mobile application on the digital device to the user when the download time of the online content is greater than a predetermined threshold time, wherein the micro-interactions is user preferred content based on the ranked list of desires associated with the at least one of the user and the friends associated with the at least one user which is obtained by searching a local database of the digital device based on a criteria for the user, wherein the database stores the user preferred content which is downloaded to the digital device when the user requests different content, and wherein the micro-interactions are provided when a difference between the download time of the online content and a time required to perform an action on the micro-interaction by the at least one of the user and the friends associated with the at least one user is zero.

2. The method as claimed in claim 1, wherein the multiple sensors comprise a proximity sensor, a gyroscope, an accelerometer and an orientation sensor.

3. The method as claimed in claim 1, further comprising: determining at least one of a tag or a comment in the one of the multiple pages; and determining the time spent on the one of the multiple pages and the time required to perform the action on the one of the multiple pages along with the determined at least one of the tag or comment on the digital device based on the profile of the at least one of the user and the friends associated with the at least one user.

4. The method as claimed in claim 1, wherein determining the time spent on the content using the mobile application and time required for making the decision on the content by the at least one of the user and the friends associated with the at least one user based on the profile of the at least one of the user and the friends associated with the at least one user, comprises:

recording triggers in the activities, wherein the triggers comprise the content that requires user's input; and determining the time spent on the content and time required for making the decision on the content.

5. The method as claimed in claim 1, wherein providing the micro-interaction comprises at least one of phone vibrations, a change of screen brightness or colors and displaying text or image snippets to the at least one user and the friends associated with the at least one user.

6. The method as claimed in claim 1, wherein the list of desires comprise at least one of reading jokes and viewing images of a person or place and content which is required to read or view based on an activity being performed.

7. A digital device comprising:
at least one processor; and
a memory communicatively coupled to the at least one processor, wherein the memory comprises an engagement unit to:

monitor, using multiple sensors in the digital device, activities performed by at least one user and friends associated with at least one user on the digital device, wherein the activities comprise collocated or non-collocated reading, browsing, playing game, chatting and a collaborative session;

determine the at least one user accessing the digital device and the friends associated with the at least one user based on the activities performed on the digital device;

create a profile for the at least one user and friends associated with the at least one user, wherein the profile comprises a voice profile, a behavior profile, a gesture profile and an activity profile; wherein the profile is created by capturing and analyzing a voice, emotions, hand gestures, behavior, eye gaze and activities monitored for the at least one user and friends associated with the at least one user;

determine time spent on content presented via a mobile application on the digital device and time required to perform an action on the content by the at least one of the user and the friends associated with the at least one user based on the profile of the at least one of user and the friends associated with the at least one user, wherein the action comprises at least one of reading, viewing and making a decision; wherein the engagement unit is further configured to:

divide the content presented on the digital device into multiple pages, wherein each of the multiple pages is a unit of content visible to the at least one of the user and the friends associated with the at least one user;

compute a number of words and images in each of the multiple pages; and determine the time spent on the content and the time required to perform the action on the content based on the profile of the at least one of the user and the friends associated with the at least one user when one of the multiple pages appears on the digital device;

determine a list of desires associated with the at least one of the user and the friends associated with the at least one user based upon at least one of the time spent on the content, time required to perform the action on the content and the activities;

rank the list of desires based on the activities to be performed by the at least one user and the friends associated with the at least one user;

compute a download time of online content when the at least one of the user and the friends associated with the at least one user request the online content by using the mobile application on the digital device, wherein said computing download time is based on obtained network latency information, number of concurrent requests, network utilization information and response time information form a remote service provider; and engage the at least one of the user and the friends associated with the at least one user by providing a micro-interaction on the digital device, while the online content is downloading over the Internet as requested by the at least one of user and the friends associated with the at least one user using the mobile application, wherein the micro-interactions are displayed via the mobile application on the digital device to the user when the download time of the online content is greater than a predetermined threshold time, wherein the micro-interactions is an user preferred content based on the ranked list of desires associated with the at least one of the user and the friends associated with the at least one user which is obtained by searching a local database of the digital device based on a criteria for the user, wherein the database stores the user preferred content which is downloaded to the digital device when the user requests different content, and wherein the micro-interactions are provided when a difference between the download time of the online content and a time required to perform an action on the micro-interaction by the at least one of the user and the friends associated with the at least one user is zero.

8. The digital device as claimed in claim 7, wherein the multiple sensors comprise a proximity sensor, a gyroscope, an accelerometer and an orientation sensor.

9. The digital device as claimed in claim 7, wherein the engagement unit is further configured to:

determine at least one of a tag or a comment in the one of the multiple pages; and determine the time spent on the one of the multiple pages and the time required to perform the action on the one of the multiple pages along with the determined at least one of the tag or comment on the digital device based on the profile of the at least one of the user and the friends associated with the at least one user.

10. The digital device as claimed in claim 7, wherein the engagement unit is configured to: record triggers in the activities, wherein the triggers comprise the content that requires user's input; and determine the time spent on the content using the mobile application and time required for making the decision on the content.

11. The digital device as claimed in claim 7, wherein providing the micro-interaction comprises at least one of phone vibrations, a change of screen brightness or colors and displaying text or image snippets to the at least one user and the friends associated with the at least one user.

12. The digital device as claimed in claim 7, wherein the list of desires comprise at least one of reading jokes and viewing images of a person or place and content which is required to read or view based on an activity being performed.

* * * * *